United States Patent [19]

Wolff et al.

[11] 4,222,915

[45] Sep. 16, 1980

[54] VULCANIZABLE HALORUBBER MIXTURES

[75] Inventors: Siegfried Wolff, Bornheim-Merten; Ewe H. Tan, Brühl, both of Fed. Rep. of Germany

[73] Assignee: Deutsche Gold- und Silber-Scheideanstalt vormals Roessler, Frankfurt, Fed. Rep. of Germany

[21] Appl. No.: 35,234

[22] Filed: May 2, 1979

[30] Foreign Application Priority Data

May 5, 1978 [DE] Fed. Rep. of Germany ....... 2819638

[51] Int. Cl.² .............................................. C08L 91/00
[52] U.S. Cl. ........................... 260/23.7 H; 260/42.15; 260/42.34; 260/736; 260/738
[58] Field of Search ............ 260/23.7 H, 42.15, 42.34, 260/736, 738

[56] References Cited

U.S. PATENT DOCUMENTS

| | | | |
|---|---|---|---|
| 2,897,173 | 7/1959 | Boggs | 260/42.15 |
| 3,419,517 | 12/1968 | Hedrick et al. | 260/37 |
| 3,775,366 | 11/1973 | Wolff et al. | |
| 3,801,537 | 4/1974 | Westlinning et al. | 260/42.33 |
| 3,873,489 | 3/1975 | Thurn et al. | 260/33.6 AQ |
| 4,036,807 | 7/1977 | Atherton | 260/42.15 |

FOREIGN PATENT DOCUMENTS

| | | |
|---|---|---|
| 2027635 | 12/1971 | Fed. Rep. of Germany . |
| 1095219 | 12/1967 | United Kingdom . |
| 1201862 | 8/1970 | United Kingdom . |
| 1289083 | 9/1972 | United Kingdom . |
| 1297210 | 11/1972 | United Kingdom . |
| 1310379 | 3/1973 | United Kingdom . |
| 1353532 | 5/1974 | United Kingdom . |
| 1439247 | 6/1976 | United Kingdom . |

OTHER PUBLICATIONS

Rubber World; Oct. 1970; pp. 54–55.

*Primary Examiner*—Lewis T. Jacobs
*Attorney, Agent, or Firm*—Cushman, Darby & Cushman

[57] ABSTRACT

There are prepared vulcanizable rubber containing mixtures comprising at least one halogen rubber, at least one silicate filler in an amount of 1 to 250 parts by weight, magnesium oxide, zinc oxide or lead oxide in an amount of 0.1 to 15 parts by weight, sulfur in an amount of 0 to 15 parts by weight, stearic acid or other higher fatty acid, benzoic acid or salicylic acid in an amount of 0 to 10 parts by weight, at least one vulcanization accelerator in an amount of 0 to 10 parts by weight, at least one plasticizer in an amount of 0 to 100 parts by weight, at least one stabilizer from the group consisting of antiagers, fatigue inhibitors, antioxidants, light protecting agents and ozone protecting agents in an amount of 0 to 10 parts by weight, carbon black in an amount of 0 to 150 parts by weight and at least one organosilane having the formula

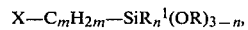
$$X-C_mH_{2m}-SiR_n^1(OR)_{3-n},$$

while X is chlorine, bromine or iodine, m is a number from 1 to 5, $R^1$ is a $C_1$ to $C_5$-alkyl group, a $C_5-C_8$-cycloalkyl group or the phenyl group, R is a $C_1$ to $C_8$ alkyl group, a $C_5$ to $C_8$-cycloalkyl group, the methoxyethyl group, the phenyl group or the benzyl group and n is 0, 1 or 2, in an amount of 0.1 to 20 parts by weight, all amounts being based on 100 parts by weight of the halogen rubber.

29 Claims, No Drawings

VULCANIZABLE HALORUBBER MIXTURES

BACKGROUND OF THE INVENTION

The invention is directed to moldable and vulcanizable mixtures which contain as essential constituents a halogen rubber, a silicate filler, in a given case admixed with carbon black and a cross-linking system for the halogen rubber.

It is known that sulfur vulcanizable rubber mixtures which have a high content of silicate fillers, as for example precipitated silica, absolutely require as a component of the mixture a silane in order to obtain sufficiently good properties in the vulcanization. Such silanes for example are the outstandingly suited but of a relatively high expense to produce bis-(alkoxysilylalkyl)-oligosulfides as for example bis(triethoxysilylpropyl)-tetrasulfide. An alternative to the separate addition of silicate fillers and silanes to the rubber mixtures consists in previous mixtures of the mentioned materials (Thurn U.S. Pat. No. 3,873,489). The entire disclosure of Thurn is hereby incorporated by reference and relied upon.

It is also known to prepare a crosslinkable rubber mixture which includes a sulfur containing organosilane, a known vulcanization accelerator and as filler a silicate filler, but which does not contain elemental sulfur, see Belgian Pat. No. 832,970 and Wolff U.S. application Ser. No. 835,848, filed Sept. 22, 1977.

There are also known mixtures based on SBR and EPDM rubbers containing a mercaptosilane such as 3-mercaptopropyltrimethoxysilane, a vinyl silane such as vinyl trimethoxysilane and an amino silane such as 3-aminopropyltriethoxysilane, Rubber World, October 1970, pages 54 and 55.

SUMMARY OF THE INVENTION

It has now been unexpectedly found that very valuable vulcanization products are formed from silicate filler containing rubber mixtures based on the chosen of halogen containing rubbers, if the mixtures contain specific halogen containing silanes which are readily available and capable of being produced in a simple manner.

There can be employed vulcanizable halogen rubber mixtures containing at least one halogen rubber, at least one silicate filler in an amount of 1 to 250 parts by weight, magnesium oxide in an amount of 0 to 15 parts by weight, e.g., 0.1 to 15 parts by weight, zinc oxide in an amount 0.1 to 15 parts by weight, sulfur in an amount of 0 to 15 parts by weight, e.g., 0.1 to 15 parts by weight, stearic acid in an amount of 0 to 10 parts by weight, e.g., 0.1 to 10 parts by weight, at least one vulcanization accelerator in an amount of 0 to 10 parts by weight, e.g., 0.1 to 10 parts by weight, at least one plasticizer in an amount of 0 to 100 parts by weight, e.g., 1 to 100 parts by weight, at least one stabilizer of the group consisting of antiagers, fatigue inhibitors, antioxidants, light protecting agents and ozone protecting agents in an amount of 0 to 10 parts by weight, e.g., 0.1 to 10 parts by weight, carbon black in an amount of 0 to 150 parts by weight, e.g., 0.1 to 150 parts by weight and at least one organosilane. The halogen rubber mixture is characterized by the use as the organosilane at least one compound of the general formula

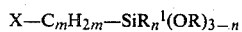

$$X-C_mH_{2m}-SiR_n^1(OR)_{3-n}$$

where X is chlorine, bromine or iodine (i.e., halogen of atomic weight 35 to 127), m is a number from 1 to 5, $R^1$ is a $C_1$ to $C_5$-alkyl group, a $C_5$ to $C_8$-cycloalkyl group or the phenyl group, R is a $C_1$ to $C_8$-alkyl group, preferably a $C_1$ to $C_5$-alkyl group, a $C_5$ to $C_8$-cycloalkyl group, the methoxyethyl group, the phenyl group or the benzyl group and n is 0, 1 or 2 in an amount of 0.1 to 20 parts by weight. All the above-mentioned parts by weight are based on 100 parts by weight of the halogen rubber.

Among the halosilanes which according to the invention must be present in the halorubber mixtures in an amount of 0.1 to 20 or preferably 1 to 10 parts by weight per 100 parts by weight of halorubber, there are especially mentioned the following silanes chloromethyl triethoxysilane, bromomethyl triethoxysilane, 1-chloro-1-methyl-methyl trimethoxysilane, 2-chloroethyl trimethoxysilane, 2-bromoethyl trimethoxysilane, 2-iodoethyl trimethoxysilane, 3-bromopropyl trimethoxysilane, 3-chloropropyl trimethoxysilane 3-iodopropyl trimethoxysilane, 3-chloropropyl triethoxysilane, 3-bromopropyl triethoxysilane, 3-iodopropyl triethoxysilane, 2-bromo-1'-methylethyl tripropoxysilane, 2-iodoethyl tri-n-butoxysilane, 2-chloroethyl-tri-2'-methylpropoxysilane, 3-bromopropyl-tri-t-butoxysilane, 3-iodopropyl triisopropoxysilane, 3-bromopropyl tri-n-pentoxysilane, 2-chloroethyl tri-2'-ethyl-ethoxysilane, 2-bromo-2'-methyl ethyl dimethoxy ethoxy silane, 3-iodopropyl methoxy ethoxy propoxysilane, 3-chloropropyl dimethoxy methylsilane, 3-bromopropyl diethoxy ethylsilane, 3-chloropropyl ethoxy diethyl silane, 3-bromopropyl tris-(1'-methoxyethoxy)-silane, 3-chloropropyl diethoxy phenylsilane, 3-iodopropyl dimethoxy cyclopentylsilane, 3-bromopropyl di-n-propoxy cyclohexylsilane, 3-chloropropyl dicyclohexoxy cycloheptylsilane, 3-chloropropyl ethoxy phenoxy ethyl silane, 3-iodopropyl benzyloxy ethoxy ethylsilane, 4-chloro-n-butyl trimethoxysilane, 4-bromobutyl trimethoxysilane, 3-chloro-2'-methyl propyl trimethoxy silane, 3-chloro-3'-methyl propyl cyclooctyl dipropoxysilane, 3-chloro-2'-ethyl propyl diethoxy methylsilane, 3-bromo-3'-ethyl propyl dimethoxy methylsilane, 3-chloro-2'-methyl propyl dimethoxy phenylsilane, 5-chloro-n-pentyl triethoxysilane, 4-bromo-1'-methyl butyl cyclooctoxy dimethoxysilane, 4-bromo-2'-methyl butyl triethoxysilane, 2-chloro-2'-methyl ethyl trioctoxysilane and 2-iodo-2'-methyl ethyltrioctyloxysilane. Additionally, there are included for example iodomethyl trimethoxysilane, chloromethyl trimethoxysilane, 3-bromopropyl triphenoxysilane, 3-chloropropyl tribenzyloxysilane, 3-iodopropyl tricyclopentoxysilane, and 3-bromopropyl tri-n-pentoxysilane.

As the halorubbers which can be used there can be employed for example halogenated butyl rubber, especially brominated or chlorinated butyl rubber, chlororubber (i.e., chlorinated natural rubber), rubber hydrochloride and preferably the halogenated butyl rubbers and particularly the polymers of 2-chlorobutadiene (e.g., chloroprene rubbers). In certain cases chlorosulfonated polyethylene can be employed.

The silicate fillers used in the invention, also employed as mixtures of two or more fillers, are known as of themselves in rubber techonology. In this connection the term "silicate filler" is broad and refers to fillers which are compatible with rubbers or which can be worked into rubbers and which consist of silicates, contain silicates and/or contain chemically bound silicates in the widest sense. Specific reference is made to the following silicate fillers.

Highly dispersed silica fillers (silicon dioxide) with specific surface areas in the range of about 5 to 1000, preferably 20 to 400 m$^2$/g (determined with gaseous nitrogen according to the known BET method) and with primary particle sizes in the range of about 10 to 400 nm, which can be produced, e.g., by precipitation from solutions of silicates with inorganic acids, by hydrothermal decomposition, by hydrolytic and/or oxidative high temperature decomposition, also called flame hydrolysis, of volatile silicon halides or by an electric arc process. These fillers in a given case can also be present as mixed oxides or oxide mixtures with the oxides of the metals aluminum, magnesium, calcium, barium, zinc, zirconium and/or titanium.

Synthetic silicates, e.g., aluminum silicate or alkaline earth silicates such as magnesium silicate or calcium silicate, with specific surface areas of about 20 to 400 m$^2$/g and primary particle sizes of about 10 to 400 nm.

Natural silicates, e.g., kaolin, clays and asbestos as well as natural silicas as for example quartz and kieselguhr.

Glass fibers and glass fiber products such as mats, strands, fabrics and the like as well as glass microballons.

The silicate fillers mentioned are preferably added in an amount of about 10 parts, or in a given case even below, up to about 250 parts by weight based on 100 parts by weight of the rubber polymers.

As mixtures of fillers there can be mentioned silica-kaolin or silica-glass fibers-asbestos as well as blends of the silicate containing reinforcing fillers with the known rubber blacks, e.g., silica-ISAF black or silica-glass fiber cord-HAF black.

Typical examples of silicate fillers useful in the invention are, e.g., the silicas or silicates produced and sold by DEGUSSA with the trademarks AEROSIL, ULTRASIL, SILTEG, DUROSIL, EXTRUSIL, CALSIL, and others. As silicate fillers according to the invention there are preferred the mentioned highly dispersed or active silicas, especially the precipitated silicas and preferably in amounts of 5 to 150 parts by weight, based on 100 parts by weight of rubber.

Carbon black can additionally be added to the rubber mixtures of the invention, not only for gray or black pigmentation of the vulcanizate but to produce paricularly valuable vulcanization properties, in which case the known rubber blacks are preferred. The carbon black is added in an amount of 0 to 150 parts by weight based on 100 parts by weight of rubber in the new rubber mixtures.

A lower limit with the number zero means in the space of the present invention that the constituent of the mixture can be present in the rubber mixture but is not essential. If carbon black is present in a mixture the lower limit is 0.1 by weight per 100 parts of rubber.

For the case of the presence of silicate filler and carbon black in the rubber mixtures the complete filler content based on 100 parts by weight of rubber is limited to a maximum of 250 parts by weight. Generally one can regard 150 parts by weight of total filler as the upper limit, although as stated the filler can be as much as 250 parts per 100 parts of rubber.

For vulcanization the new rubber mixtures need at least one vulcanization agent for the corresponding halorubber. For this purpose there can be used the agents known in rubber technology for cross-linking or vulcanization. For example for the polychlorobutadiene rubbers there are the known metal oxides such as magnesium oxide, zinc oxide and/or lead oxide, especially magnesium oxide.

As accelerators or vulcanization accelerators, there are suited the accelerators employed in the rubber working industry and for the most part usable for several types of rubbers. However, there can be included in the new halogen rubber mixtures special vulcanization accelerators. As the usable vulcanization accelerators, there can be mentioned the thiocarbamate, xanthogenate and thiuram accelerators, furthermore the thiazole accelerators, including the mercapto and sulfenamide accelerators, amine accelerators or aldehyde amine accelerators, basic accelerators, including for example the guanidine accelerators and other basic accelerators; see "Vulkanisation and Vulkanisation-shilfsmitted", collective of Dr. W. Hofmann, Leverkusen (Verlag Berliner Union, Stuttgart, 1965, pages 140, et seq., and also especially page 122) as well as, independent from the above classification, the general vulcanization accelerator classes of mercapto, disulfide, polysulfide, sulfenamide, thiazole and thiourea accelerators. In the thiuram accelerators there are included essentially the tetraalkyl or dialkyl diaryl thiuram mono, di and tetrasulfides such as tetramethyl thiuram monosulfide, tetramethyl thiuramdisulfide, tetraethyl thiuramdisulfide, dipentamethylene thiurammonosulfide, -disulfide, -tetrasulfide and -hexasulfide, dimethyl diphenyl thiuramdisulfide, diethyl diphenyl thiuramdisulfide, etc.

The dithiocarbamate accelerators are in general derivatives of the dialkyl, alkyl cycloalkyl and alkyl aryl dithiocarbamic acids. Two known members of this class of accelerators are pentamethylene ammonium-N'-pentamethyl dithiocarbamate and zinc dialkyl dithiocarbamate, e.g., zinc diethyl dithiocarbamate.

Xanthogenate accelerators are the known derivatives of the alkyl and aryl xanthogenic acid as for example zinc diethyl xanthogenate.

Among the mercapto accelerators there are especially mentioned 2-mercaptobenzothiazole, 2-mercaptoimidazoline, mercaptothiazoline as well as a series of monomercapto and dimercaptotriazine derivatives (see for example British Pat. No. 1,095,219 and related Westlinning U.S. Pat. No. 3,366,598. The entire disclosure of Westlinning is hereby incorporated by reference and relied upon). Mercaptotriazine accelerators for example are 2-diethanolamino-4,6-bis mercaptotriazine and 2-ethylamino-4-diethylamino-6-mercapto-s-triazine.

Disulfide and sulfenamide accelerators for example are disclosed in British Pat. No. 1,201,862 and related Westlinning U.S. Pat. No. 3,801,537. The entire disclosure of Westlinning is hereby incorporated by reference and relied upon. Among such accelerators are 2-diethylamino-4-bis-(cyclohexylsulfenamido)-s-triazine, 2-di-propylamino-4,6-bis-(N-tert.butyl-sulfenamido)-s-triazine as well as N-cyclohexyl-2-benzothiazole sulfenamide. Among the disulfide accelerators there are included for example bis-(2-ethylamino-4-diethylamino-triazin-6-yl)-disulfide, bis-(2-methylamino-4-di-isopropylamino-triazin-6-yl)-disulfide as well as dibenzo thiazyl disulfide.

Further sulfidic triazine accelerators are the polysulfidic or oligosulfidic triazine derivatives and their polymers which are produced according to German OS No. 20 27 635 and also are disclosed in British Pat. No. 1,353,532 and related Wolff U.S. Pat. No. 3,775,366.

The entire disclosure of Wolff is hereby incorporated by reference and relied upon.

Among the aldehyde amine accelerators there are included condensation products of saturated or unsaturated aliphatic aldehydes with ammonia or aromatic amines, as for example butyraldehyde-aniline and butyraldehyde-butyl amine. Other basic accelerators for example are guanidine derivatives such as diphenyl guanidine and di-o-tolyl guanidine as well as amino accelerators such as hexamethylenetetraamine. Among the thiourea accelerators there are included for example thiourea itself and the diaryl thioureas such as 1,3-diphenyl-2-thiourea.

Preferably there are employed in the halorubber mixtures of the invention the accelerators of the thiourea class, as for example ethylene thiourea. However, there are also especially suited mixtures of the thiourea accelerators and the so-called sulfenamides, the thiurams of the amines or mixtures of a thiuram and a guanidine accelerator, in a given case together with sulfur as a vulcanizing agent.

For vulcanization of chlorosulfonated polyethylene there is preferably employed magnesium oxide, particularly of fine or small particle sizes, in a given case in combination with one of the mentioned thiazole accelerators and/or thiuram accelerators such as dibenzothiazyl disulfide and/or dipentamethylene thiuram tetrasulfide. As antiager there is preferably employed nickel dibutyl dithiocarbamate.

For vulcanization of halogen and especially chlorobutyl rubbers there are employed for example zinc oxide and/or magnesium oxide in combination with the mentioned accelerators, as, e.g., the thiazoles and/or thiurams.

The accelerator is employed according to the invention in the customary amounts, in a given case in an amount of 0.2 to 10 parts by weight based on 100 parts by weight of the halorubber.

Known stabilizers, especially those from the group of antiaging agents, fatigue inhibitors, antioxidants, light protecting agents and ozone protecting agents, as well as mixtures of those, can be added with advantage in the rubber mixtures of the invention, namely in amounts of 0.2 to 10 parts by weight based on 100 parts by weight of the halorubber.

Furthermore, it can be of particular advantage if the halorubber mixtures contain a plasticizer or plasticizer oil, for example highly aromatic naphthenic or paraffinic plasticizer, advantageously those with low setting points between about 0° and −60° C. The amount of plasticizer oil can swing within wide limits, thus it can be more than 0.5 or 5 parts by weight, especially more than 10 parts up to about 100 parts by weight, per 100 parts of halogen rubber.

The mentioned halosilanes added according to the invention are obtained by a known process from halosilanes still having at least one hydrogen atom by catalytically controlled addition to a C—C double bond of a halohydrocarbon having such a double bond (hydrosilylation). The halogen atoms located at the silicon atoms are then in likewise known manner, changed into alkoxysilane, for example through alcoholysis.

The new halorubber mixtures preferably contain an organic acid which is solid at room temperature, as they are known to be useful in the rubber technology, in an amount of 0.2 to 10 parts by weight based on 100 parts by weight of rubber. Preferably there are employed fatty acids such as stearic acid, or corresponding acids of the homologous series, for example, palmitic acid, myristic acid and lauric acid, as well as benzoic acid and salicylic acid. Furthermore there must be added in the rubber mixtures of the invention oxides of polyvalent metals, as they likewise find use in the rubber technology, in an amount of 0.1 to 15 parts by weight based on 100 parts by weight of rubber. Of primary importance among these metal oxides is zinc oxide, particularly in finely divided and/or active form. Furthermore there are also advantageously employed magnesium oxide or in a given case lead oxide. These oxides are preferably added in finely divided, active or powdery form. Mixtures of the metal oxides can also be used.

The new halorubber mixtures are produced in customary manner. A two-step mixing cycle is preferred. In the first step the following constituents are mixed in a kneading apparatus at a flow (throughput) temperature between 55° C. and 85° C., preferably 60° C.:

Within the first minute the rubber and metal oxide, thus for example polychlorobutadiene and magnesium oxide are mixed;

within the next one and a half minutes half of the silicate filler and any other fillers;

within the next one and a half minutes the second half of the silicate filler, the organosilane, the plasticizer, e.g., plasticizer oil and the remaining constituents of the mixture with the expection of the accelerator and zinc oxide;

after a total of four and a half minutes the mixture is expelled from the kneader.

In the second mixing step there is mixed into the preliminary mixture from the first mixing step the zinc oxide and the accelerator on a pair of rolls at a temperature of about 45° to 55° C., preferably 50° C.

This two-step mixing process avoids the premature pre-vulcanization of the mixture.

Industrial areas of use of the described rubber mixtures and their vulcanizates for example are: industrial rubber articles such as cable jackets, hoses, heating tubes, driving belts, V-belts, conveyor belts, roll coverings, packings, electrical insulation, coatings, impregnating agents and coatings for fabrics, damping elements and vibration elements and the like articles which demand high requirements in regard to temperature and/or oil resistance. The excellent effect of the halosilanes of the above-mentioned general formula in halorubber containing mixtures or molding materials and their cross-linked products or vulcanizates was very surprising.

The invention is also directed to a process of vulcanizing or cross-linking halorubber mixtures of the type set forth above at a temperature between 100° and 200° C. for a time of 1 to 200 minutes depending on the heating temperature.

Likewise the invention is directed to the use of the halogen containing silanes of the above-mentioned general formula as reinforcing additives in the described cross-linkable or vulcanizable rubber mixtures.

Unless otherwise indicated all parts and percentages are by weight.

The compositions can comprise, consist essentially of, or consist of the materials set forth.

Without limiting the invention there are given in the following examples several recipes for the new halorubber mixtures with test results, including the cross-linked products, with evaluation or comparisons of these results. Therein there are repeated many different concepts so that the following abbreviations are used.

LIST OF ABBREVIATIONS USED

| Abbreviation | Designation | Measured In |
|---|---|---|
| $t_5$ | Mooney-scorch time (130° C.) | Minutes |
| $t_{35}$ | Mooney-cure time (130° C.) | Minutes |
| ML4 | Mooney plasticity at 100° C., standard rotor testing time 4 minutes | |
| VT | Vulcanization temperature | °C. |
| ZF | Tensile strength | kp/cm² |
| M100 | Modulus 100% | kp/cm² |
| M200 | Modulus 200% | kp/cm² |
| M300 | Modulus 300% | kp/cm² |
| BD | Elongation at break | % |
| E | Rebound | % |
| SH | Shore A - Hardness | — |
| A | Abrasion (also "DIN abrasion") | mm³ |
| ΔT | Temperature increase (see Goodrich Flexometer) | °C. |
| CS | Compression set B, 22 hours 70° C. | % |

TESTING STANDARDS

The physical tests were carried out at room temperature according to the following standard specifications.

| (DIN = German Industrial Standard) | |
|---|---|
| Tensile strength, elongation at break and stretching value on 6 mm large rings | DIN 53504 |
| Tear propagation resistance | DIN 53507 |
| Rebound | DIN 53512 |
| Shore A hardness | DIN 53505 |
| Specific gravity | DIN 53550 |
| Mooney Test | DIN 53524 |
| Goodrich-Flexometer (Determination of the heat build up, ΔT) | ASTM D 623-62 |
| Abrasion, also called DIN abrasion | DIN 53516 |
| Determination of compression set of rubber | DIN 53517 |

The cross-linked products or moldings were always produced in a steam heated multiple plate press at the stated vulcanization and heating times (cross-linking times).

In the examples the amounts of components of the mixtures are given in parts by weight.

The comparison mixtures are identified with the letter V before the number. The corresponding mixtures of the invention are identified with the letter E.

DESCRIPTION OF THE PREFERRED EMBODIMENTS

EXAMPLE 1

There were produced three rubber mixtures from the following constituents.

| | Mixture | | |
|---|---|---|---|
| | V 1 | E 1.1 | E 1.2 |
| Polychlorobutadiene rubber (chlorine content about 38%; viscosity 40 to 45 Mooney units: Baypren 210 of Bayer A.G.) | 100 | 100 | 100 |
| Magnesium oxide, finely divided | 4 | 4 | 4 |
| Stearic acid | 1 | 1 | 1 |
| Vaseline (salve type, pure hydrocarbon mixture from the residue of petroleum distillation) | 1 | 1 | 1 |
| Phenyl-β-naphthylamine | 2 | 2 | 2 |
| Finely divided precipitated silica (filler ULTRASIL® VN 3 of Degussa) | 50 | 50 | 50 |
| Highly aromatic plasticizer oil | 10 | 10 | 10 |
| 3-chloropropyl triethoxysilane | — | 2 | — |
| 2-chloroethyl triethoxysilane | — | — | 2 |
| Zinc oxide, finely divided, active | 5 | 5 | 5 |

The viscosity determination of the mixture gave the following values.

| | V 1 | E 1.1 | E 1.2 |
|---|---|---|---|
| ML4 | 133 | 108 | 109 |

After the shaping of the test pieces produced from the mixtures the cross-linking was carried out at 155° C. in 60 minutes. The tests gave the following values:

TABLE 1

| | Mixture | | |
|---|---|---|---|
| | V 1 | E 1.1 | E 1.2 |
| ZF | 172 | 202 | 195 |
| M100 | 19 | 24 | 24 |
| M200 | 37 | 60 | 56 |
| M300 | 60 | 104 | 100 |
| BD | 703 | 525 | 520 |
| E | 28 | 26 | 27 |
| SH | 65 | 67 | 68 |
| A | 132 | 103 | 110 |
| CS 22 h/70° C. | 30.1 | 10.2 | 16.9 |
| CS 70 h/100° C. | 44.0 | 22.6 | 27.4 |

From the Mooney-viscosity (ML4) values it can be seen that by the addition of the chlorosilane the viscosities of rubber mixtures E 1.1 and E 1.2 are clearly reduced compared to the viscosity of the comparison mixture V 1 without the silane. This is synonymous with reducing the work. Thus at lower viscosities there is needed less energy expense in the production of the mixtures. Without the addition of chlorosilane there can even occur the situation that the compounds of the mixture cannot be worked to a homogenous mixture because the viscosity is too high.

The cross-linked products of the mixtures of the invention show a clearly raised tensile strength, a strong increase of the moduli, a strong improvement of the compression set and a reduction of the abrasion. All of the mentioned test results for the rubber mixtures of the invention or their cross-linked products show a considerable improvement of the industrial rubber properties of the cross-linked products.

EXAMPLE 2

Of the eight following rubber mixtures, four are mixtures according to the invention and four are comparison mixtures. The comparison mixtures are always placed first and they are so-called blind mixtures, that is, they contain no silane. The mixtures of the invention on the contrary contain a chlorosilane. The four groups of two mixtures contain four different light fillers.

| Mixture Constituents | Mixtures | | | | | | | |
|---|---|---|---|---|---|---|---|---|
| | V 2 | E 2 | V 3 | E 3 | V 4 | E 4 | V 5 | E 5 |
| Polychlorobutadiene rubber (BAYPREN 210; see Example 1) | 100.0 | 100.0 | 100.0 | 100.0 | 100.0 | 100.0 | 100.0 | 100.0 |
| Magnesium oxide, finely divided | 4.0 | 4.0 | 4.0 | 4.0 | 4.0 | 4.0 | 4.0 | 4.0 |
| Stearic acid | 1.0 | 1.0 | 1.0 | 1.0 | 1.0 | 1.0 | 1.0 | 1.0 |
| Vaseline (see Example 1) | 1.0 | 1.0 | 1.0 | 1.0 | 1.0 | 1.0 | 1.0 | 1.0 |
| Antiager poly-2,2,4-trimethyl-1,2-dihydroquinoline | 2.0 | 2.0 | 2.0 | 2.0 | 2.0 | 2.0 | 2.0 | 2.0 |
| Finely divided precipitated aluminumsilicate (SILTEG® AS 7 of DEGUSSA) | — | — | — | — | 50.0 | 50.0 | — | — |
| Precipitated light reinforcing filler, essentially consisting of silica (average primary particle size of about 25 nm; surface area according to BET 16 $m^2/g$. DUROSIL® of Degussa) | 50.0 | 50.0 | — | — | — | — | — | — |
| Silica filler of average activity (average primary particle size about 85 nm; surface area according to BET 35 $m^2/g$. EXTRUSIL® of Degussa) | — | — | 50.0 | 50.0 | — | — | — | — |
| Kaolin (so-called Hardclay, air-floated SUPREX CLAY of J. M. Huber | — | — | — | — | — | — | 100.0 | 100.0 |
| Highly aromatic plasticizer oil | 10.0 | 10.0 | 10.0 | 10.0 | 10.0 | 10.0 | 10.0 | 10.0 |
| 3-Chloropropyltriethoxysilane | — | 2.0 | — | 2.0 | — | 2.0 | — | 2.0 |
| Ethylene thiourea | 0.75 | 0.75 | 0.75 | 0.75 | 0.75 | 0.75 | 0.75 | 0.75 |
| Zinc oxide, finely divided, active | 5.0 | 5.0 | 5.0 | 5.0 | 5.0 | 5.0 | 5.0 | 5.0 |

The cross-linking of the eight mixtures after the shaping took place at 155° C. in 60 minutes. The listing of the cross-linking products gave the following values:

TABLE 2

| | V 2 | E 2 | V 3 | E 3 | V 4 | E 4 | V 5 | E 5 |
|---|---|---|---|---|---|---|---|---|
| ZF | 63 | 117 | 64 | 97 | 59 | 96 | 95 | 125 |
| M100 | 28 | 35 | 21 | 25 | 24 | 31 | 33 | 66 |
| M200 | 46 | 83 | 34 | 56 | 44 | 76 | 45 | 120 |
| M300 | — | — | 47 | 85 | — | — | 56 | — |
| BD | 270 | 270 | 390 | 360 | 280 | 240 | 557 | 225 |
| E | 42 | 46 | 46 | 47 | 45 | 50 | 39 | 42 |
| SH | 68 | 72 | 62 | 66 | 66 | 68 | 68 | 69 |
| A | 202 | 139 | 280 | 224 | 229 | 157 | 323 | 272 |
| CS 22 h/70° C. | 11.9 | 5.5 | 9.5 | 5.0 | 7.3 | 4.9 | 40.2 | 10.7 |
| ΔT | 65 | 54 | 54 | 46 | 59 | 47 | 67 | 75 |

As can be seen from the values of Table 2 above there again resulted improvement in properties worthy of note for the cross-linked products of mixtures E 2 to E 5 of the invention similar to the improvement described in the preceding example.

EXAMPLE 3

The following mixture of the invention different from the preceding mixtures contains a carbon black-silica mixture as filler and has the following composition.

| Constituents of the Mixture | Mixtures | |
|---|---|---|
| | V 6 | E 6 |
| Chlorinated butyl rubber (chlorine content 1.1 to 1.3; viscosity 51 to 60 Mooney units; Chlorobutyl HT 10-66 of Esso Chemicals Co., U.S.A.) | 100 | 100 |
| Low structured furnace-black (average particle size about 50 nm; surface area according to BET about 30 $m^2/g$. CORAX® G of Degussa) | 35 | 35 |
| Finely divided, precipitated silica (filler ULTRASIL® VN 3 of Degussa) | 35 | 35 |
| 3-Chloropropyltriethoxysilane | — | 2 |
| Stearic acid | 1 | 1 |
| Magnesium oxide | 2 | 2 |
| 2,2'-methylene-bis-(4-methyl-6-tert.-butylphenol | 1 | 1 |
| Highly aromatic plasticizer oil | 25 | 25 |
| Zinc oxide, finely divided, active | 5 | 5 |
| Tetramethylthiuramdisulfide | 1 | 1 |
| Dibenzothiazyldisulfide | 2 | 2 |

The cross-linking took place at 160° C. in 60 minutes. The testing of the cross-linked products gave the following values.

TABLE 3

| | V 6 | E 6 |
|---|---|---|
| ZF | 62 | 75 |
| M300 | 29 | 39 |
| BD | 575 | 500 |
| SH | 49 | 50 |
| CS 22 h/70° C. | 17.7 | 9.2 |

From the values of mixture E 6 of the invention it can be seen that by the addition of only 2 parts by weight of 3-chloropropyl triethoxysilane the most important industrial properties of the rubber were clearly improved. Thus particularly the Compression Set fell from 17.7 to 9.2% which represents an improvement worthy of note.

EXAMPLE 4

The two following mixtures contain a different halorubber and had the following composition.

| Constituents of the Mixture | V 7 | E 7 |
|---|---|---|
| Brominated butyl rubber | 100 | 100 |
| Magnesium oxide, finely divided | 4 | 4 |
| Stearic acid | 1 | 1 |
| Vaseline (see Example 1) | 1 | 1 |
| Antiager poly-2,2,4-trimethyl-1,2-dihydroquinoline | 2 | 2 |
| Finely divided, precipitated silica (filler ULTRASIL ® VN 3 of Degussa) | 50 | 50 |
| Highly aromatic plasticizer oil | 10 | 10 |
| 3-Chloropropyltriethoxysilane | — | 2 |
| Ethylenethiourea | 0.75 | 0.75 |
| Zinc oxide, finely divided, active | 5 | 5 |

The cross-linking of the two rubber mixtures after the shaping was carried out at 165° C. in 30 minutes. The testing of the cross-linked products gave the following results.

TABLE 4

| | V 7 | E 7 |
|---|---|---|
| ZF | 85 | 90 |
| M300 | 69 | 87 |
| BD | 360 | 310 |
| SH | 64 | 64 |
| CS 22 h/70° C. | 22.7 | 12.2 |

The cross-linked product of mixture E 7 of the invention again showed especially a clear increase in modulation and a noticeable reduction in Compression Set.

The entire disclosure of German priority application No. P 28 19 638.5-43 is hereby incorporated by reference.

What is claimed is:

1. A vulcanizable rubber composition comprising at least one halogen containing rubber, at least one silicate filler in an amount of 1 to 250 parts by weight, 0.1 to 15 parts by weight magnesium oxide, lead oxide or zinc oxide, 0 to 15 parts by weight sulfur, 0 to 10 parts by weight of a higher fatty acid, benzoic acid or salicylic acid, 0 to 10 parts by weight of a vulcanization accelerator, 0 to 100 parts by weight of a plasticizer, 0 to 10 parts by weight of a stabilizer selected from the group consisting of antiagers, fatigue inhibitors, antioxidants, light protecting agents and ozone protecting agent, 0 to 150 parts by weight of carbon black and 0.1 to 20 parts by weight of an organosilane having the formula $$X-C_mH_{2m}-SiR_n^1(OR)_{3-n}$$

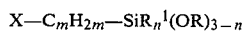

where X is chlorine, bromine or iodine, m is a number from 1 to 5, $R^1$ is a $C_1$ to $C_5$-alkyl group, a $C_5$–$C_8$-cycloalkyl group or the phenyl group, R is a $C_1$ to $C_8$-alkyl group, a $C_5$ to $C_8$-cycloalkyl group, the phenyl group or the benzyl group and n is 0, 1 or 2, all amounts being based on 100 parts by weight of the halogen containing rubber.

2. A vulcanizable composition according to claim 1 wherein $R^1$ is $C_1$ to $C_5$-alkyl and R is $C_1$ to $C_5$-alkyl.

3. A vulcanizable composition according to claim 2 wherein n is 0.

4. A vulcanizable composition according to claim 3 wherein m is 2 or 3.

5. A vulcanizable composition according to claim 4 wherein R is ethoxy and X is chlorine.

6. A vulcanizable composition according to claim 5 wherein the halogen containing rubber is polychlorobutadiene, chlorobutyl rubber or bromobutyl rubber.

7. A vulcanizable composition according to claim 6 wherein the silicate is precipitated silica, precipitated aluminum silicate or kaolin.

8. A vulcanizable composition according to claim 7 free from carbon black.

9. A vulcanizable composition according to claim 7 containing carbon black.

10. A vulcanizable composition according to claim 7 wherein the silicate is precipitated silica.

11. A vulcanizable composition according to claim 1 wherein the rubber is brominated or chlorinated butyl rubber, chlorinated natural rubber, rubber hydrochloride, a polymer of 2-chlorobutadiene-1,3 or chlorosulfonated polyethylene.

12. A vulcanizable composition according to claim 11 containing zinc oxide.

13. A vulcanizable composition according to claim 11 containing magnesium oxide.

14. A vulcanizable composition according to claim 11 containing both zinc oxide and aluminum oxide.

15. A vulcanizable composition according to claim 11 free from carbon black.

16. A vulcanizable composition according to claim 11 containing carbon black.

17. A vulcanizable composition according to claim 11 containing stearic acid.

18. A vulcanizable composition according to claim 11 containing a vulcanization accelerator.

19. The vulcanized product obtained by vulcanizing the composition of claim 1.

20. The vulcanized product obtained by vulcanizing the composition of claim 3.

21. The vulcanized product obtained by vulcanizing the composition of claim 4.

22. The vulcanized product obtained by vulcanizing the composition of claim 6.

23. The vulcanized product obtained by vulcanizing the composition of claim 7.

24. The vulcanized product obtained by vulcanizing the composition of claim 10.

25. The vulcanized product obtained by vulcanizing the composition of claim 11.

26. The vulcanized product obtained by vulcanizing the composition of claim 12.

27. The vulcanized product obtained by vulcanizing the composition of claim 15.

28. The vulcanized product obtained by vulcanizing the composition of claim 16.

29. A process of vulcanizing the composition of claim 1 comprising heating the composition of claim 1 at 100° to 200° C. for 1 to 200 minutes.

* * * * *